United States Patent [19]

Chin et al.

[11] Patent Number: 5,299,315

[45] Date of Patent: Mar. 29, 1994

[54] PERSONAL COMPUTER WITH PROGRAMMABLE THRESHOLD FIFO REGISTERS FOR DATA TRANSFER

[75] Inventors: Arthur L. Chin, Boca Raton; Serafin J. Eleazar-Garcia, Jr., Boynton Beach; Timothy V. Lee, Boca Raton; Don S. Keener, Boca Raton; Gregory J. Moore, Boca Raton; Eric S. Stine, Delray Beach, all of Fla.

[73] Assignee: International Business Machines Corp., Armonk, N.Y.

[21] Appl. No.: 947,013

[22] Filed: Sep. 17, 1992

[51] Int. Cl.⁵ ............................................. G06F 13/14
[52] U.S. Cl. ................................. 395/250; 395/325
[58] Field of Search .................... 395/250, 425; 364/228.5, 229.2, 238.2, 238.3, 238.4, 238.6, 239.6, 239.7, 239.8, 240.5, 242.6, 242.92, 242.93

[56] References Cited

U.S. PATENT DOCUMENTS

| | | | |
|---|---|---|---|
| 4,124,888 | 11/1978 | Washburn | 364/200 |
| 4,470,114 | 9/1984 | Gerhold | 364/200 |
| 4,858,107 | 8/1989 | Fedele | 364/200 |
| 5,016,160 | 5/1991 | Lambeth et al. | 364/200 |
| 5,086,385 | 2/1992 | Launey et al. | 364/188 |
| 5,101,490 | 3/1992 | Getson et al. | 395/425 |
| 5,129,036 | 7/1992 | Dean et al. | 395/2 |
| 5,187,792 | 2/1993 | Dayan et al. | 395/725 |
| 5,220,651 | 6/1993 | Larson | 395/250 |

Primary Examiner—Dale M. Shaw
Assistant Examiner—Moustafa Meky
Attorney, Agent, or Firm—Daniel E. McConnell

[57] ABSTRACT

This invention relates to personal computers, and more particularly to a personal computer using a FIFO registers for data transfer as illustrated by a bus master device in the form of a small computer systems interface (SCSI) controller for controlling data transfer with storage memory devices such as fixed or removable media electromagnetic storage devices. In the practice of this invention, the efficiency of a system having a plurality of bus master devices is enhanced by providing for a programmable threshold fill condition for a FIFO register before arbitration for bus control occurs. Thus the invention provides an approach to maximizing the efficiency of data transfer where FIFO registers are used.

6 Claims, 4 Drawing Sheets

PERSONAL COMPUTER WITH PROGRAMMABLE THRESHOLD FIFO REGISTERS FOR DATA TRANSFER

TECHNICAL FIELD

This invention relates to personal computers, and more particularly to a personal computer using a FIFO registers for data transfer as illustrated by a bus master device in the form of a small computer systems interface (SCSI) controller for controlling data transfer with storage memory devices such as fixed or removable media electromagnetic storage devices.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 56, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As the reader knowledgeable about computer systems will understand, much of the operation of a personal computer system is concerned with the transfer of data from one point within the system to another. In a number of instances where such transfers are to occur, transfers are made through registers known as FIFO (for "first in, first out") registers. For various types of transfers, it has been known to monitor the "fill level" of a FIFO register, by registering in an associated register the amount of data retained in a FIFO register at any given moment.

As the development of personal computers has advanced, there have been proposals for certain standards to be established among makers and users of such apparatus for the purpose of enabling greater exchangability of components and the like. One such standard which has achieved some broad acceptance is the small computer systems interface (SCSI) standard for data communication to and from storage memory devices. For the present purposes, "storage memory devices" is defined broadly to include all devices capable of storing data in digital form, with particular emphasis on such devices as fixed or removable media electromagnetic storage devices (also known as hard and floppy disk drives), electro-optical, tape and other storage devices. SCSI controllers (herein also called "data flow controllers") have been known and used prior to this invention, and will be familiar to the knowledgeable reader. SCSI controllers are known to be one example of an environment of use of FIFO registers for data transfer, although there are others.

In prior personal computer systems, SCSI controllers have typically been arranged as option or accessory devices, accessed by the system through the accessory or input/output or I/O bus. More recently, it has been contemplated to provide a SCSI controller as a single very large scale integrated (VLSI) device or application specific integrated circuit (ASIC) chip, and to provide for connection of that controller directly with the local processor bus. The purpose of so providing such a controller is to achieve enhanced performance in terms of expedited data transfers.

SCSI controllers are one example of a device which is known as a "bus master". As described at greater length hereinafter, a plurality of bus master devices may be provided in a personal computer system (of either Family I or Family II type) in an effort to enhance system performance. Where such a plurality of bus master devices are present, the devices arbitrate for access to and control of the data transfer bus of the system. The efficiency with which the bus master devices and the arbitration control point through which arbitration occurs allocate use of the bus has a great deal to do with the performance achieved by the system.

BRIEF DESCRIPTION OF THE INVENTION

Having in mind the foregoing discussion, this invention provides an approach to maximizing the efficiency of data transfer where FIFO registers are used. In realizing this purpose, the efficiency of a system having a plurality of bus master devices is enhanced by providing for a programmable threshold filland empty condition for a FIFO register before arbitration for bus control occurs. By practicing this invention, systems with heavy data transfer demands or heavy channel traffic may use high fill thresholds before arbitration is allowed, reducing the overhead incurred by arbitration and improving system performance. In systems with light channel flow, low thresholds will increase system response time by taking advantage of lesser bus traffic.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
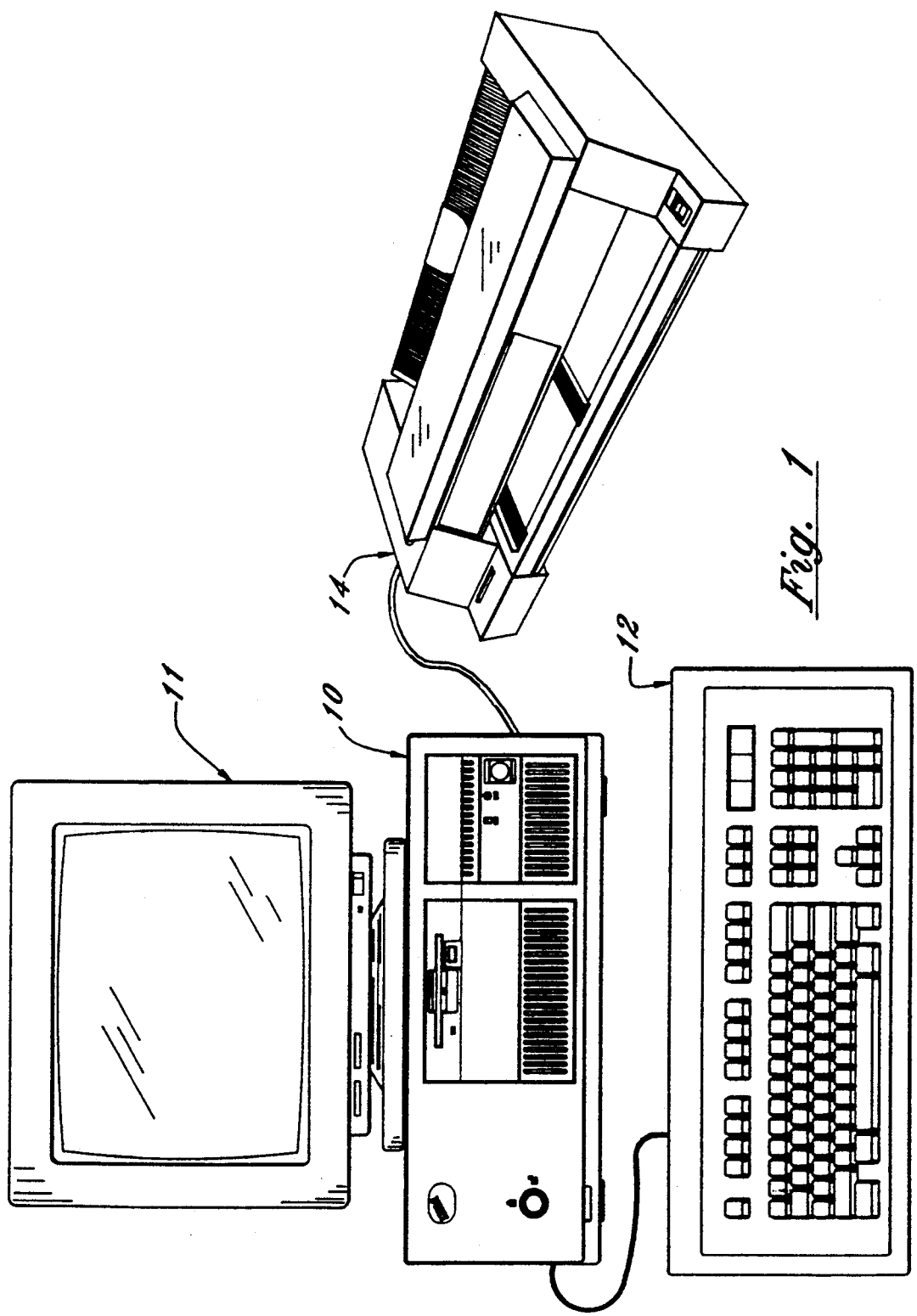
FIG. 1 is a perspective view of a personal computer embodying this invention.
Figure 2:
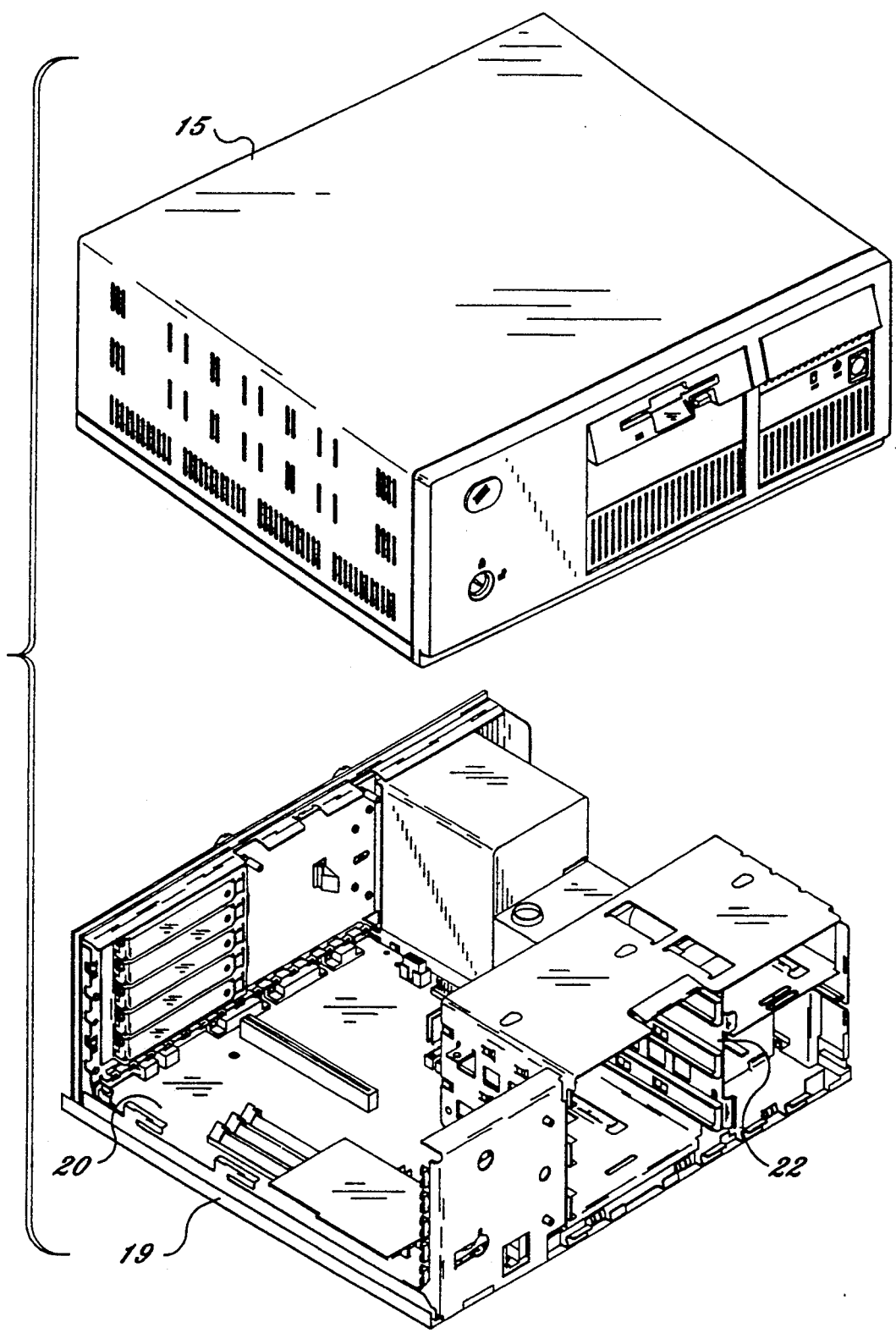
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
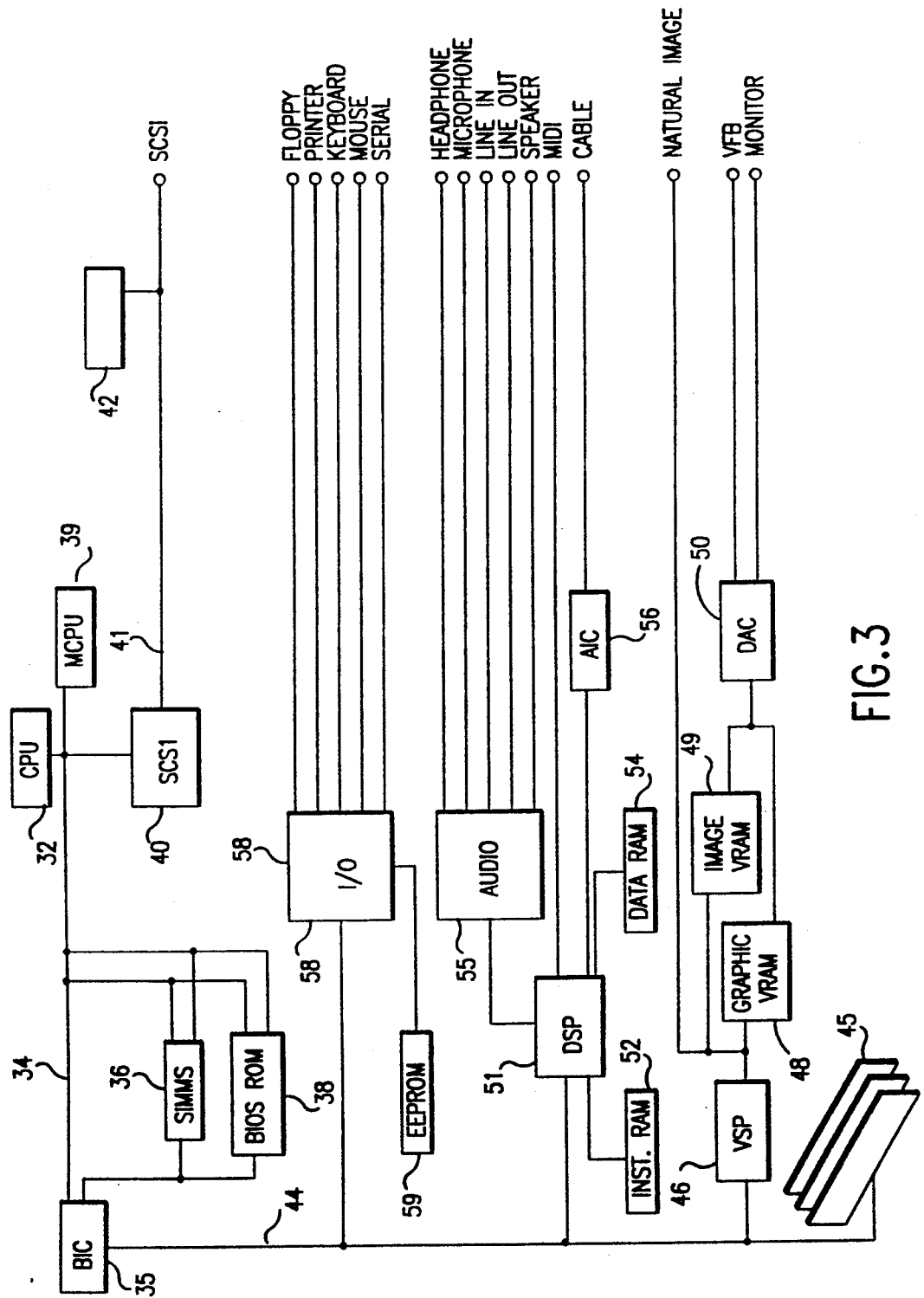
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 486SLC which is manufactured by IBM. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80386 microprocessor.

Returning now to FIG. 3, the CPU local bus 34 (comprising data, address and control components) also provides for the connection of the microprocessor 32 with a math coprocessor 39 and a Small Computer Systems Interface (SCSI) data flow controller 40, about which more is said hereinafter. The SCSI controller 40 may, as is known to persons skilled in the arts of computer design and operation, be connected or connectable by way of a SCSI bus 41 with suitable external devices of a variety of types. The SCSI controller 40 functions as a storage controller in controlling storage memory devices such as fixed or removable media electromagnetic storage devices (also known as hard and floppy disk drives), electro-optical, tape and other storage devices. One such device is schematically illustrated in FIG. 3 at 42. While here illustrated as being a device connected directly with the local processor bus 34, the present invention also contemplates that the SCSI controller 40 may be provided as an option device connected through the I/O bus 44 mentioned hereinafter. Depending upon the particular system configuration involved, such connection by way of the I/O bus may be preferable and/or the only connection available for practice of this invention.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Figure 4:
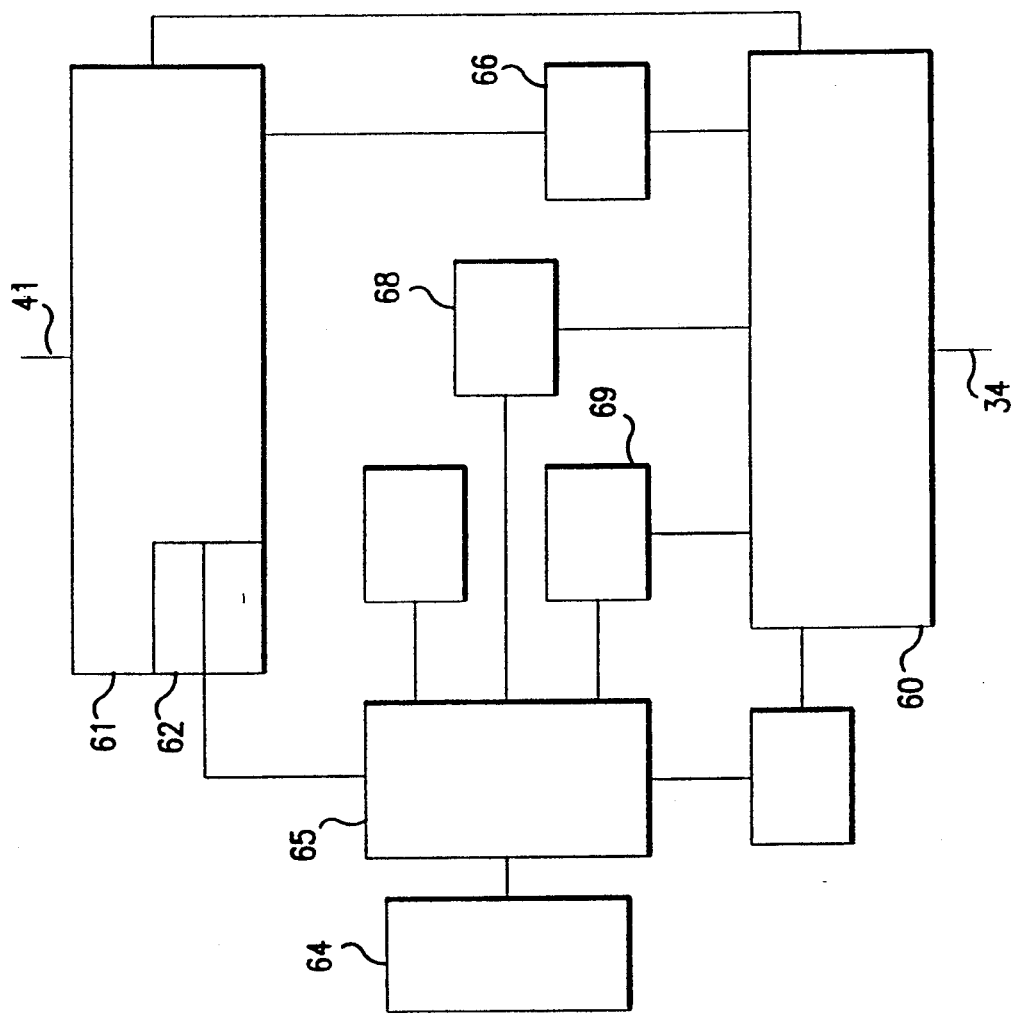
FIG. 4 is a schematic representation of certain functional components incorporated in the storage controller of the personal computer of FIGS. 1 through 3.

Referring now to FIG. 4, the data flow 40 controller (there illustrated in a block diagram form) has a first interface circuit 60 for exchanging signals with the CPU 32 and RAM 36, and a second interface circuit 61 for exchanging signals with the SCSI devices and operatively interconnected with the first interface circuit 60 for passing data between the SCSI devices and the RAM 36. The first interface circuit may also be referred to as the system interface, and is preferably connected either with the I/O bus 44 or the local processor bus 34. The second interface circuit may also be referred to as the controller core, and is preferably connected with the SCSI bus across which data is transferred to and from the associated storage devices. The second interface circuit 61 has at least one register 62 for storing data indicative of the content and status of a plurality of sequences of commands ("threads") issued to the SCSI devices.

The data flow controller 40 is provided with a controller processor 64 for controlling the flow of data through the first and second interface circuits 60, 61 and between the SCSI devices and the RAM 36. The controller processor preferably is an 8032 device operatively connected with the first interface circuit 60 for receiving instructions issued from the system CPU 32 and operatively connected with the second interface circuit 61 for issuing to the SCSI devices sequences of commands directing an exchange of data with the SCSI devices. A third interface circuit 65 is operatively connected with the first interface circuit 60 and with the second interface circuit 61 and with the controller processor 64 for passing to the controller processor that instruction among a plurality of instructions which is indicated by status indicative data stored in the register 62 to be the next instruction to control a command to be executed.

The data flow controller 40 further has a data FIFO register 66 operatively connected between the first and second interface circuits 60, 61 for passing data therebetween. The data flow controller also has an instruction FIFO register 68 operatively connected between the first and third interface circuits 60, 65 for passing therebetween instructions issued from the CPU 32 and intended for processing by the controller processor 64. The data flow controller 40 further has a decoding state machine 69 operatively connected between the second and third interface circuits 61, 65 for decoding instructions received from the CPU 32 into commands for execution by SCSI devices connected by way of the SCSI bus 41.

The data flow controller 40 is, in the system here disclosed, a bus master device.

In connection with this characterization of the data flow controller 40, it is appropriate to consider the support by a personal computer of what have been known as multiple masters or bus masters. As here used, a "master" is a processor or any circuit designed to gain control over a bus and drive address, data and control signals on the bus. Having such capability enables a master device to transfer information between system memory and other devices.

It has been proposed that masters be divided among three types—system master (usually the CPU), DMA controller, and bus master. The system master controls and manages the system configuration. It is usually the default master in the system. The default master owns the bus when no other master requires it. A DMA master is a special type of master which transfers data between DMA slaves and memory slaves, and does not arbitrate for the bus but services the DMA slave that is the arbitrator. As here used, a bus master arbitrates for use of the bus and supports information transfers with an I/O slave or memory slave.

What makes a device a "bus master" can be confusing, as bus masters do not necessarily require a processor. Also, a bus master may be called on to respond as a slave when accessed by another bus master. A bus master is distinguished by the capability of gaining control of the bus through arbitration and controlling the execution of a defined bus cycle. Generally, there are three types of bus masters: full function, special function controllers, and programmable special function controllers. The fundamental differences among them are degrees of flexibility, function and cost. The full function bus master is the most flexible, has the most function, and costs most. Typically, a full function bus master will have its own programmable CPU and be capable of controlling all system resources, including operating system software. Special function controllers have the least flexibility, function and cost. Typically, a special function controller will use logic circuits but no CPU to perform a specific function while requiring little or no assistance from other masters. Programmable special function controllers span the range between the other two. The fundamental difference between special function and programmable special function controllers is the ability to modify the function and/or execution characteristics of the bus master. Such modification can be accomplished through use of processing units or through settable registers.

Within the definitions here given, the CPU 32, MCPU 39, and SCSI controller 40 may all function as masters directly coupled to or on the local bus 34, while the I/O controller 58, DSP 51, VSP 46 and possibly accessory boards 45 mounted in the MICRO CHANNEL slots may all function as masters directly coupled to or on the input/output bus 44.

With such multiple masters, the BIC 35 functions as an arbitration point to provide for arbitration among devices directly coupled to the input/output bus 44 for access to the input/output bus and to the local processor bus 34, and for arbitration among the input/output bus 44 and the master devices coupled directly to the local processor bus 34 for access to the local processor bus 34.

As pointed out hereinabove, when a plurality of bus master devices are arbitrating for access to and control of a data transfer bus and particularly where those devices effectuate data transfer through FIFO registers, some orderly rule or guide as to when arbitration shall occur can be used to optimize system performance. This invention specifically proposes such a solution.

More specifically, the present invention contemplates that an appropriate register be used to set (by software) a threshold fill and empty value before arbitration will be sanctioned. That is, a configuration register such as the register 70 in accordance with this invention will have an associated register which contains a threshold value for the FIFO. The associated bus master device (here, the data flow controller 40) will arbitrate for access to and control of the bus only when the number of bytes to be transferred into or out of the FIFO is equal to or greater than the assigned threshold value stored in the threshold register.

By way of example, a threshold register may use the state of two bit positions in the register to distinguish among fill levels of 87%, 75%, 63% and 50%. If set to recognize a fill level of 50% as the threshold and working with a FIFO having a capacity of 64 bytes, initiation of a request to empty the FIFO would require that the FIFO contain at least 32 bytes of data before arbitration would be sanctioned. In the case of filling a FIFO, the associated device would not attempt to gain access and control over the bus until at least 32 bytes of FIFO space were available to be filled.

In the event that there was a need to empty or fill a FIFO without regard to the threshold value, this could be accomplished by generating a FLUSH type of signal to override the use of the threshold.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:
   a high speed data bus,
   an input/output data bus,
   a plurality of bus master devices each coupled directly to one corresponding one of two busses, namely (i) said high speed data bus and (ii) said input/output data bus, for transferring data through said one corresponding one of two busses, one of said bus master devices being a microprocessor coupled directly to said high speed data bus and functioning as a system central processing unit,
   a bus interface controller coupled directly to both of said high speed data bus and said input/output data bus for providing communications between said high speed data bus and said input/output data bus, said bus interface controller (i) providing for arbitration among such ones of said bus master devices as are directly coupled to said high speed data bus for access to said high speed data bus and (ii) further providing for arbitration among said high speed data bus and such ones of said bus master devices as are directly coupled to said input/output bus for access to said input/output data bus, and
   one of said bus master devices other than said microprocessor having a data FIFO register operatively connected between said one other bus master device and a corresponding one of said high speed data bus and said input/output data bus to which said one other bus master device is directly coupled for passing data therebetween and also having a threshold register, said threshold register for receiving from said FIFO register bits indicating a threshold fill level of said FIFO register required before arbitration through said bus interface controller will be sanctioned.

2. A personal computer system according to claim 1 wherein said system further comprises storage memory devices for nonvolatile storage of data, and wherein said plurality of bus master devices further includes a storage controller coupled directly to said high speed data bus and to said storage memory devices for regulating communications with said storage memory devices.

3. A personal computer system according to claim 1 wherein said plurality of bus master devices further includes an input/output controller.

4. A personal computer system according to claim 1 wherein said plurality of bus master devices further includes a digital signal processor.

5. A person computer system according to claim 1 wherein said plurality of bus master devices further includes a video signal processor.

6. A personal computer system comprising:
   a high speed data bus;
   a microprocessor coupled directly to said high speed data bus;
   volatile memory coupled directly to said high speed data bus for volatile storage of data;
   storage memory devices for nonvolatile storage of data;
   a storage controller coupled directly to said high speed data bus and to said storage memory devices for regulating communications with said storage memory devices;
   an input/output data bus;
   an input/output controller coupled directly to said input/output data bus;
   a digital signal processor coupled directly to said input/output data bus;
   a video signal processor coupled directly to said input/output data bus; and
   a bus interface controller coupled to said high speed data bus and to said input/output data bus for providing communications between said high speed data bus and said input/output data bus, said bus interface controller providing for arbitration among said microprocessor and said storage controller coupled directly to said high speed data bus for access to said high speed data bus, and providing for arbitration among said input/output controller and said digital signal processor and said video signal processor coupled directly to said input/output data bus and said high speed data bus for access to said input/output data bus,
   at least one of said storage controller and said input/output controller and said digital signal processor and said video signal processor having a data FIFO register operatively connected between the corresponding one of said input/output controller and said digital signal processor and said video signal processor and the corresponding one of said busses for passing data therebetween and also having a threshold register for receiving bits indicating a threshold fill level of said FIFO register required before arbitration through said bus interface controller will be sanctioned.

* * * * *